United States Patent
Meier

(10) Patent No.: US 6,663,536 B1
(45) Date of Patent: Dec. 16, 2003

(54) CONTROL SYSTEM FOR VARIABLE TORQUE DISTRIBUTION FOR A FOUR-WHEEL-DRIVE VEHICLE

(75) Inventor: Kurt Meier, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 79 days.

(21) Appl. No.: 09/691,189

(22) Filed: Oct. 19, 2000

(30) Foreign Application Priority Data

Oct. 19, 1999 (DE) .......................... 199 50 205

(51) Int. Cl.$^7$ .......................... B60K 41/24; B60K 41/20
(52) U.S. Cl. .................. 477/184; 180/248; 180/249; 477/180
(58) Field of Search .................. 477/180, 183, 477/184, 185, 186, 187; 701/69, 84, 79; 180/247, 244, 249, 233; 430/425.5, 438; 303/113.5, 112, 143

(56) References Cited

U.S. PATENT DOCUMENTS

| | | | | |
|---|---|---|---|---|
| 3,706,351 A | * | 12/1972 | Neisch | 180/313 |
| 3,978,718 A | * | 9/1976 | Schorsch | 73/117.3 |
| 4,467,886 A | * | 8/1984 | DeClaire et al. | 180/197 |
| 4,890,685 A | * | 1/1990 | Naito | 180/233 |
| 4,967,869 A | * | 11/1990 | Nagaoka et al. | 180/197 |
| 4,981,190 A | | 1/1991 | Nakayama et al. | 180/197 |
| 5,004,064 A | * | 4/1991 | Tezuka et al. | 180/197 |
| 5,093,790 A | | 3/1992 | Shiraishi et al. | |
| 5,105,903 A | * | 4/1992 | Buschmann | 180/197 |
| 5,125,490 A | * | 6/1992 | Suzumura et al. | 180/249 |
| 5,168,955 A | * | 12/1992 | Naito | 180/197 |
| 5,219,038 A | * | 6/1993 | Hamada et al. | 180/197 |
| 5,275,254 A | * | 1/1994 | Shiraishi et al. | 180/248 |
| 5,969,640 A | * | 10/1999 | Timm et al. | 180/169 |
| 6,007,454 A | * | 12/1999 | Takahira et al. | 180/197 |

FOREIGN PATENT DOCUMENTS

| | | |
|---|---|---|
| DE | 4002821 | 8/1990 |
| DE | 40 02 821 | 8/1990 |
| EP | 0453931 | 10/1991 |
| EP | 0574962 | 12/1993 |

* cited by examiner

*Primary Examiner*—Rodney H. Bonck
*Assistant Examiner*—Eric M. Williams
(74) *Attorney, Agent, or Firm*—Crowell & Moring LLP

(57) ABSTRACT

A control system for variable torque distribution for a four-wheel-drive vehicle with a system for brake control that is possible because of wheel-selective brake intervention wherein a non-variable longitudinal lock with specified torque distribution ratio is provided. If no slip is present, a symmetrical braking intervention is made at the wheels of the axle whose torque transmission percentage will be reduced in comparison to the other axle by changing the torque distribution ratio between the wheels of the rear axle and the wheels of the front axle.

8 Claims, 3 Drawing Sheets

CONTROL SYSTEM FOR VARIABLE TORQUE DISTRIBUTION FOR A FOUR-WHEEL-DRIVE VEHICLE

BACKGROUND AND SUMMARY OF THE INVENTION

This application claims the priority of German Patent Document 199 50 205.6, filed Oct. 19, 1999, the disclosure of which is expressly incorporated by reference herein.

The invention relates to a control system for variable torque distribution for a four-wheel-drive vehicle.

A control system of this type is described e.g., in German Patent Document DE 40 02 821 A1 wherein a torque distribution device changes the torque ratio between the front and rear wheels by appropriate control of a friction clutch as a longitudinal lock. By determining a torque distribution ratio, both the driving performance and the traction of a vehicle can be considerably influenced. A similar control system is also known from European Patent EP 0 911 205 A2. However, controllable clutches as longitudinal locks are complicated, heavy and expensive.

Designing a wheel-selective brake intervention on one wheel where the slip has occurred in a four-wheel-drive vehicle is also known from DE 40 02 821 A1. As a result of this structure, stability control does not occur until an instability has already occurred. In this process, there is a problem that must be solved, in that the reference vehicle speed for recognition of a slipping drive wheel cannot be determined as usual on the basis of the circumferential speeds of the wheels that are not driven.

In addition, the use of high torque distribution ratios (Torque Bias Ratios TBR=Torque_high/Torque_low) means problems in the calculation of the reference speed for slip control systems and also high levels of tension in the drive train when driving around curves.

In an object of the present invention to provide an improved control system for changing the distribution ratio and having increased safety and a reduction in cost and construction space.

According to the present invention, a non-variable longitudinal lock with specified torque distribution ratio is provided with a control system for variable torque distribution for a four-wheel-drive vehicle with a brake control system through which a wheel-selective brake intervention is possible. To change the torque distribution ratio, a symmetrical brake intervention occurs on the wheels of the axle, whose torque transmission percentage is to be reduced in relationship to the other axle, if no slip is present.

Brake control systems for wheel-selective brake interventions are known, especially as a combination of anti-lock brakes, traction control and driving dynamics control systems. A symmetrical brake intervention means that the same braking torque is applied to both wheels of the axle whose torque transmission percentage will be reduced in relationship to the torque transmission percentage on the other axle.

Because the brake intervention can be adjusted without slip, the advantages of a variable torque transmission ratio can be achieved in such a way that the stability is increased even before the occurrence of an instability, according to the requirements in various drive conditions. For example, the torque transmission percentage at the wheels of the rear axle is increased during drive-away or the torque transmission percentage at the wheels of the front axle is increased when driving around curves. However, the adjustment of the torque transmission ratio can not be implemented exclusively by brake interventions because loud noises and high tension in the drive train can occur due to continuous regulation. These disadvantages are eliminated by the fundamental use of a simple longitudinal lock with the usually required fixed, base torque transmission ratio. The change in the torque transmission ratio because of the brake intervention will be carried out, if necessary, e.g., depending on the steering angle, the wheel load, the coefficient of friction at the individual wheels, the yaw angle, the yaw angle speed, the float angle, the lateral acceleration, the slope and/or the pitch and on other operating parameters that describe the momentary driving status.

In a first alternative according to an advantageous further development of the invention, the engine torque is automatically increased in an amount that corresponds to the total braking torque of the brake intervention, in order to avoid any reduction in the total traction torque.

In a second alternative according to an advantageous further development of the invention, the driver receives a recommendation, preferably visual, acoustic or haptic, for engine torque reduction until an engine torque increase is achieved by corresponding actuation of the accelerator pedal in an amount corresponding to the total braking torque of the brake intervention. If a driver should want to avoid an automatic engine torque increase, he can decide if he considers a driving torque increase necessary.

Other objects, advantages and novel features of the present invention will become apparent from the following detailed description of the invention when considered in conjunction with the accompanying drawings.

BRIEF DESCRIPTION OF THE DRAWINGS

The drawing shows an embodiment of the invention. In each case, the same momentary possible coefficients of friction are present at the wheels.

DETAILED DESCRIPTION OF THE DRAWINGS

Figure 1:
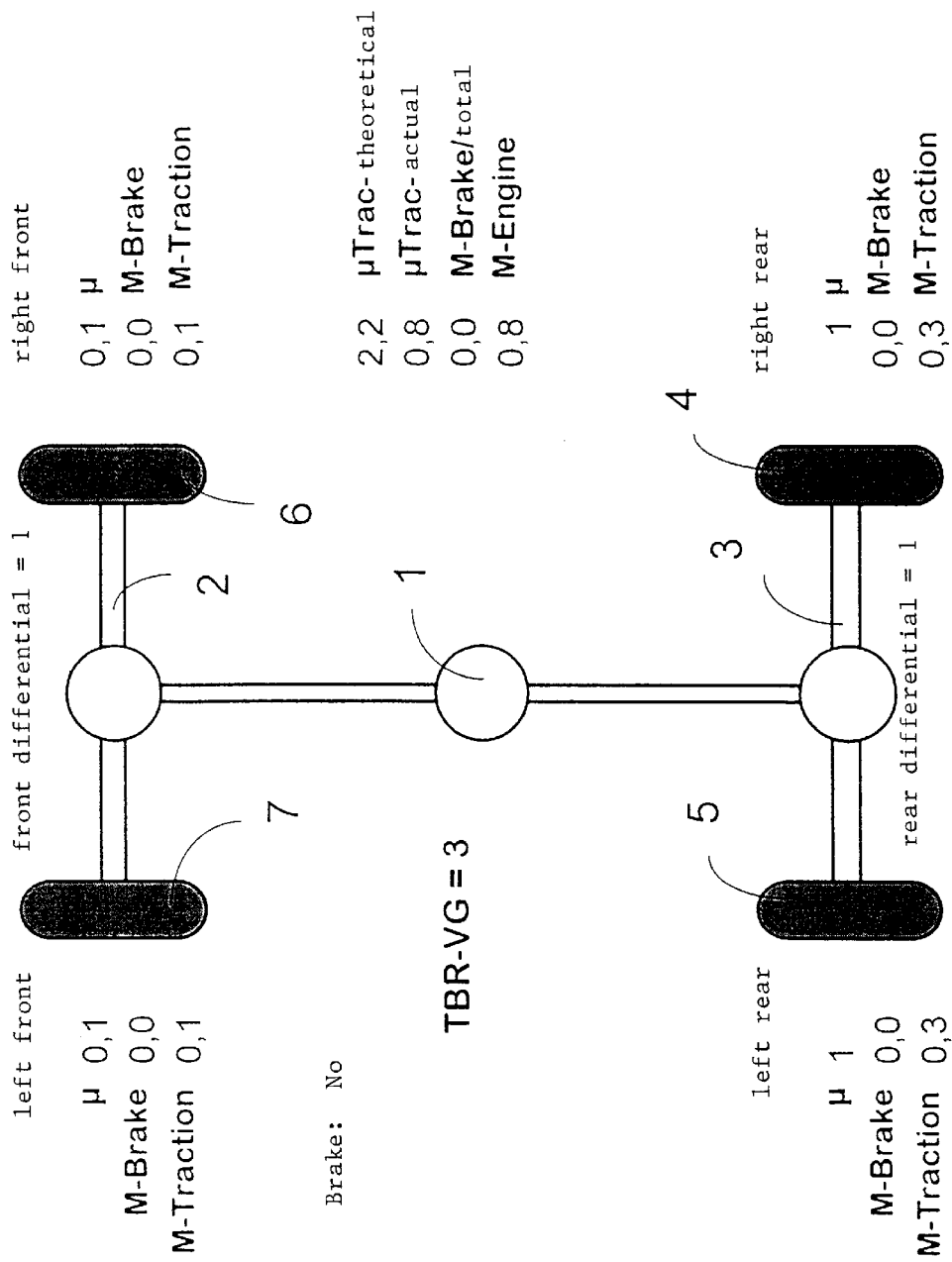
FIG. 1 shows a four-wheel-drive vehicle without brake intervention having longitudinal lock designed for fixed adjustment of a relatively small torque transmission ratio.
Figure 2:
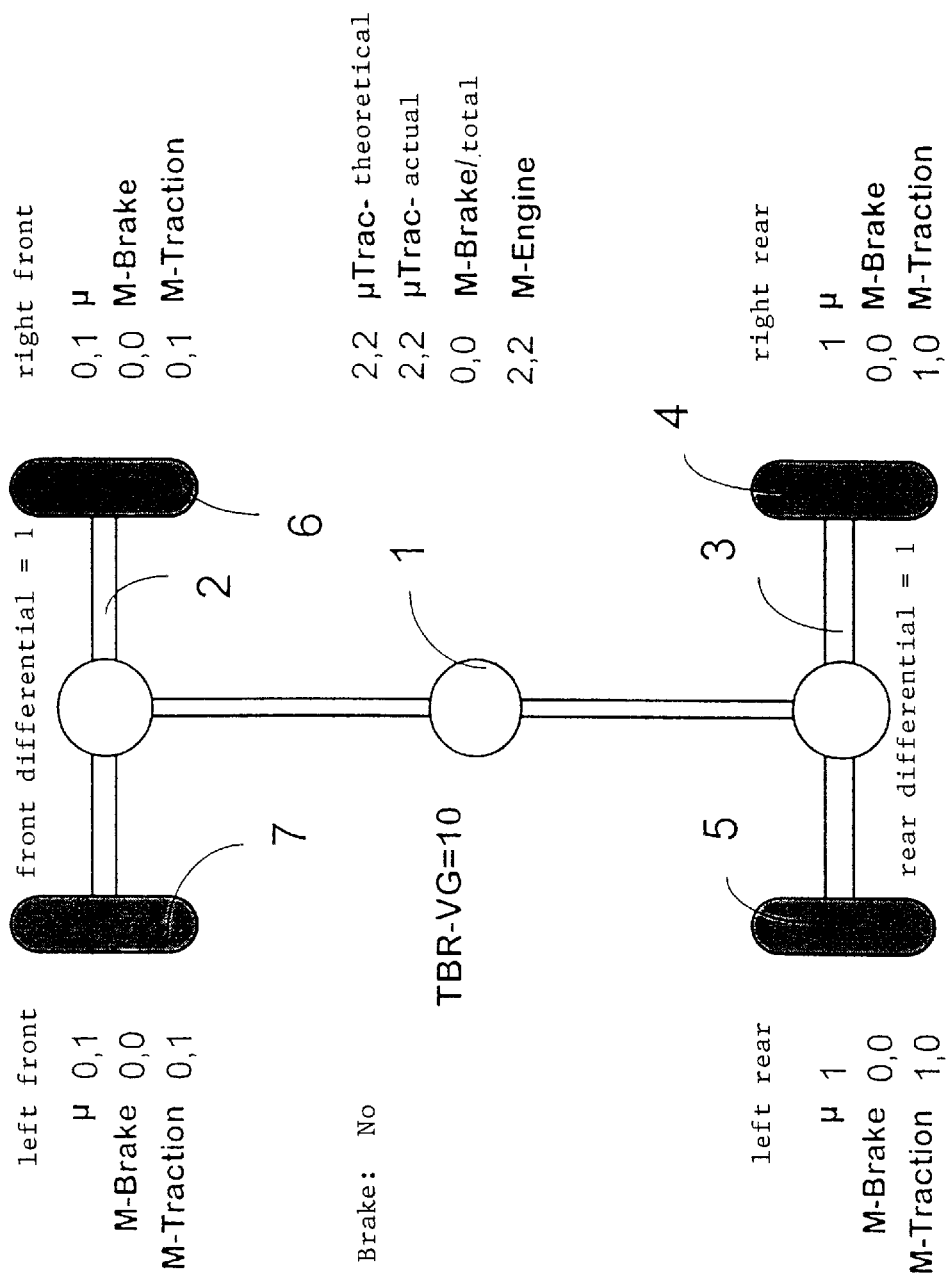
FIG. 2 shows a four-wheel-drive vehicle without brake intervention having a longitudinal lock designed for fixed adjustment of a relatively large torque transmission ratio.
Figure 3:
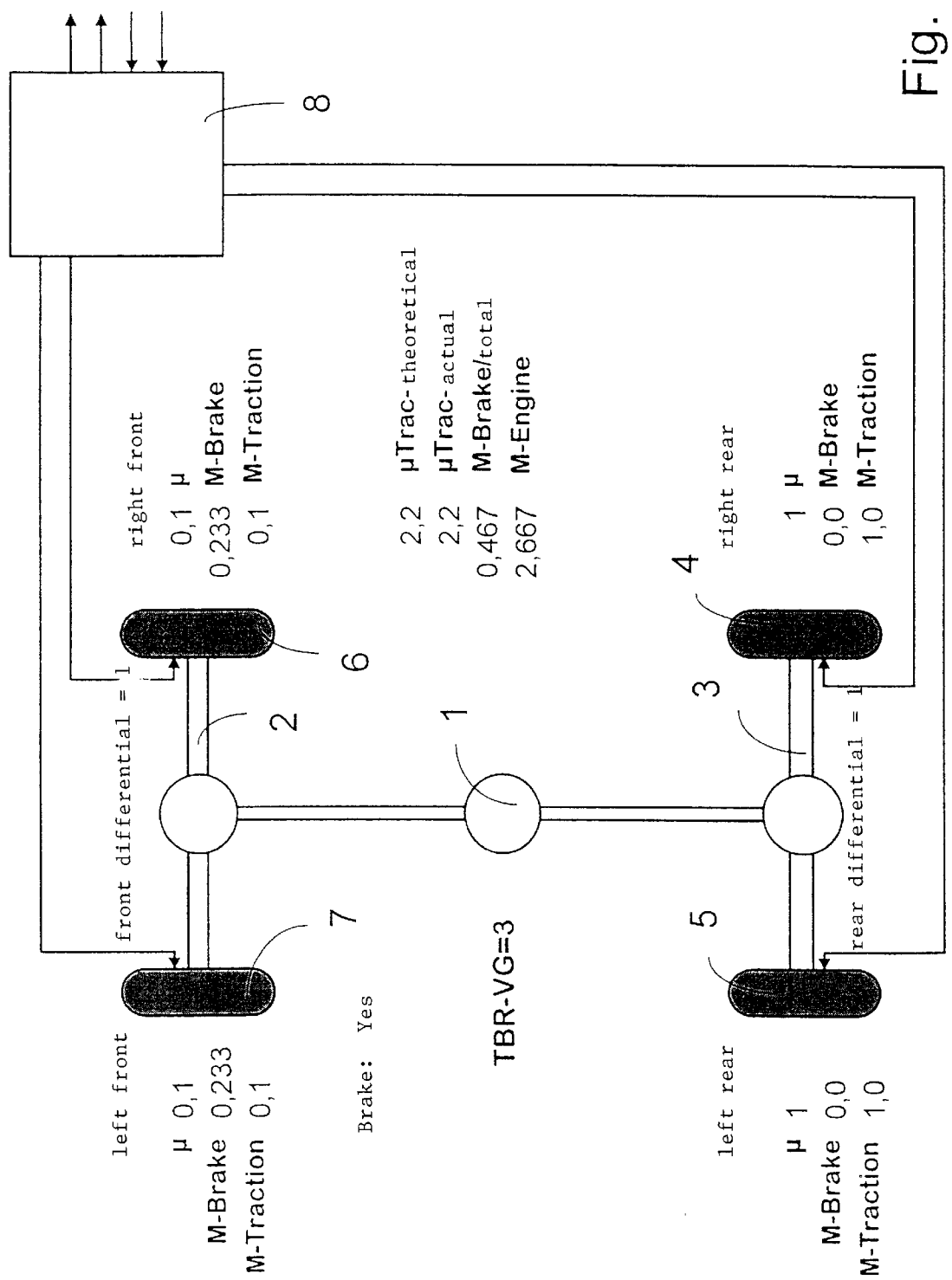
FIG. 3 shows a four-wheel-drive vehicle with brake intervention having the longitudinal lock shown in FIG. 1.

FIGS. 1 to 3 each show a four-wheel-drive vehicle with a fixed, i.e., non-variable, longitudinal lock 1 with one axle differential each for front axle 2 and rear axle 3 and with wheels 4, 5, 6 and 7. For simplification, open axle differentials (VAG=1 and HAG=1) are assumed.

Wheels 6 and 7 of front axle 2 will have e.g., a momentary possible coefficient of friction of $\mu=0.1$; i.e., there is no slip present that still has to be compensated. Wheels 4 and 5 of rear axle 3 each have a momentary possible coefficient of friction of $\mu=1$. All indicated torques are standardized according to coefficients of friction between 0 and 1.

FIG. 1 shows the layout of the longitudinal lock 1 for a fixed basic torque transmission ratio TBR-VG=3. This means wheels 4 and 5 of rear axle 3 transfer 3 times the amount of traction torque M-traction as the amount of traction torque M-traction of wheels 6 and 7 of front axle 2, without braking intervention. Thus with a coefficient of friction of $\mu=0.1$ and/or a maximum possible traction torque M-traction=0.1 on each of wheels 6 and 7 of front axle 2, in each case only a traction torque of M-traction=0.3 can be transferred when the fixed torque transmission ratio TBR-VG=3 is present at wheels 4 and 5 of axle 3. The total torque to be applied by the internal combustion engine is in this case M-engine=0.8 and is composed of the total ($\mu$Trac-actual) of the M-traction traction torques on all wheels 4, 5, 6 and 7. FIG. 1 excludes braking intervention (brakes=no). No braking torques are present (M-brake=0).

If it were possible to set a higher torque transmission ratio TBR-VG, because of the maximum possible coefficient of friction $\mu$=1, a traction torque of up to M-traction=1.0 could be reached on each of wheels 4 and 5. It would be possible to reach this maximum possible traction torque of M-traction=1.0 at the given coefficient of frictions A without braking intervention by a longitudinal lock 1 with a torque transmission ratio of TBR-VG=10. This case is shown in FIG. 2. However, a base torque transmission ratio of this type would be too high for most vehicles. A longitudinal lock with variable torque transmission ratio is too complicated.

FIG. 3 shows the invention. Here, the vehicle also has a control unit 8 as part of a system for brake control that is possible because of a wheel-selective brake intervention. To do this, the control unit 8 is connected to the brake actuators of wheels 4, 5, 6 and 7. The control unit 8 preferably has signal inputs for recording the operating parameters represented by the respective driving status (e.g., steering angle, acceleration, yaw angle, etc.). In particular, the momentary possible coefficient of frictions $\mu$ are recorded in control unit 8. In addition, the torque distribution ratio TBR-VG=3 transferred by longitudinal lock 1 is known to the control unit 8. Functions necessary for the control system for variable torque distribution are preferably integrated in control unit 8.

In the present example, the maximum possible traction torque M-traction =1.0 based on the current coefficient of friction $\mu$ will be achieved on each of wheels 4 and 5, in spite of a longitudinal lock 1, with a basic torque transmission ratio of only TBR-VG=3 by means of the symmetrical braking intervention according to the invention. The requirement is that no slip (slip: $\mu$=≈0) is present so that no anti-lock braking, traction control and/or driving dynamics control must be activated. In comparison to the control system according to the invention, the latter control has a higher priority since in that case, an instability is already present.

In the example according to FIG. 3, according to the invention first the maximum possible total traction torque $\mu$Trac-Th will be determined according to the coefficient of frictions $\mu$. This total traction torque is the total of the maximum possible traction torques M-traction that can be transferred by way of wheels 4, 5, 6 and 7; i.e., 0.1+0.1+1+1=2.2. However, only a total traction torque $\mu$Trac-actual of 0.1+0.1+0.3+0.3=0.8 is actually transferred without braking intervention (see FIG. 1). This differential torque of 1.4 must be compensated by the total braking torque (left front M-brake and right front M-brake) of the symmetrical brake intervention. To do this, the same brake torque M-brake is applied to wheels 6 and 7 of front axle 2. In this process, it should be noted that this braking torque acts according to the torque distribution ratio TBR-VG=3; i.e., in the present case, the fact that the necessary total braking torque is only ⅓ of the differential torque. Therefore, the braking torque to be applied to each of wheels 6 and 7 of front axle 2 is approx. M-brake=0.233. Because of this symmetrical braking intervention, the torque transmission ratio is changed as if a longitudinal lock 1 were present without braking intervention with a torque transmission ratio of TBR-VG=10.

The engine torque M-engine and/or the torque of the internal combustion engine must advantageously be increased by corresponding actuation of the accelerator pedal, or automatically by the amount 0.467, which corresponds to the total braking torque of the brake intervention, so that no reduction of the total traction torque $\mu$Trac-actual occurs.

In addition to this, reference is made to the fact that in the present embodiment, only a simplification is used for the coefficient of frictions A on the longitudinal axis. However, the symmetrical braking intervention is also carried out if the coefficient of frictions p are asymmetrical along the longitudinal axis.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A variable torque distribution control system for a four-wheel drive vehicle with a brake control system having wheel-selective brake intervention, said control system comprising;

a longitudinal lock having a predetermined specified torque distribution ratio;

means for providing a symmetrical braking intervention at a first set of wheels of a first axle when substantially no slip is present at said first set of wheels wherein a torque transmission percentage of said first axle is less than a torque transmission percentage of a second axle in order to modify a torque distribution ratio between a second set of wheels of said second axle and said first set of wheels of said first axle.

2. The control system according to claim 1, further including means for automatically increasing a torque of an engine of said vehicle by an amount which corresponds to a total braking torque from said means for braking intervention.

3. The control system according to claim 1, wherein an operator of said vehicle receives an indication for engine torque increase until said engine torque is increased by an amount corresponding to a total brake torque resulting from said means for brake intervention and wherein said increased amount is caused by corresponding actuation of an accelerator pedal of said vehicle.

4. A system according to claim 1, further including an engine torque controller which automatically increases the engine torque by an amount corresponding to the total braking torque of said braking intervention.

5. The system according to claim 1 further including a driver indicator which outputs an indication to a driver of said vehicle to increase the torque of the engine until an engine torque increase is achieved by corresponding actuation of an accelerator pedal which increases corresponds to the total brake torque of the braking intervention.

6. The control system according to claim 1, wherein said predetermined specified torque distribution ratio is greater than 1.

7. A variable torque distribution system for a four-wheel drive vehicle, said system comprising:

a non-variable longitudinal lock having a specified torque distribution ratio;

a symmetrically braking control providing, when substantially no slip is present at a first set of wheels of a first axle a symmetrically braking intervention at said first set of wheels of said first axle whereby the torque transmission percentage of the first axle is reduced in comparison to the torque transmission percentage of a second axle whereby the torque distribution ratio between a second set of wheels of the second axle and the first set of wheels of the first axle is modified.

8. The variable torque distribution system according to claim 7, wherein said specified torque distribution ratio is greater than 1.

* * * * *